United States Patent [19]

Schwarzbich

[11] 3,847,456

[45] Nov. 12, 1974

[54] CYLINDRICAL ROLLER THRUST BEARING

[76] Inventor: Jörg Schwarzbich, 4801 Hager 38A, Germany

[22] Filed: Dec. 1, 1972

[21] Appl. No.: 311,281

[30] Foreign Application Priority Data
Mar. 16, 1972 Germany............................ 2212621

[52] U.S. Cl.................................. 308/217, 308/235
[51] Int. Cl............................................. F16c 33/46
[58] Field of Search..................... 308/217, 216, 235

[56] References Cited
UNITED STATES PATENTS

| | | | |
|---|---|---|---|
| 1,464,666 | 8/1923 | Slater | 308/217 |
| 1,958,725 | 5/1934 | Stein | 308/235 |
| 2,347,483 | 4/1944 | Katcher | 308/235 |
| 2,665,958 | 1/1954 | Waldherr | 308/235 |

FOREIGN PATENTS OR APPLICATIONS

| | | |
|---|---|---|
| 1,034,931 | 7/1958 | Germany |
| 1,446,492 | 6/1966 | France |

Primary Examiner—Charles J. Myhre
Assistant Examiner—R. H. Lazarus
Attorney, Agent, or Firm—Charles E. Baxley

[57] ABSTRACT

This disclosure teaches a cylindrical roller thrust bearing with a roller cage provided on either its inner or outer circumference or on both with a deformable lip the axially outer edges of which are inclined to the axis of rotation of the bearing. Steel discs forming the roller raceway are held in place by the lip which is inserted in snap-like fashion. The steel discs are provided preferably at their outer circumferences with a burr over which an edge of the lip engages and a rounding axially outward of the burr to receive the edge. The steel discs may each be borne by a plastic ring which is supported and held by a bead formed in its outer circumference and engaged behind the lip.

21 Claims, 9 Drawing Figures

CYLINDRICAL ROLLER THRUST BEARING

BACKGROUND OF THE INVENTION

The present invention resides in the field of antifriction bearings and concerns in particular a cylindrical roller thrust bearing. This cylindrical roller thrust bearing preferably is used for supports which carry out swinging movements, for instance steering knuckle arm supports in automotive vehicles.

Previously known cylindrical roller thrust bearings are formed of a large number of individual parts. The construction of these known bearings is such that an outer shell surrounding a roller cage is recessed on one end, with insertion of a packing, preferably an O-ring, in the recess. Such known cylindrical roller thrust bearings are therefore asymmetrical with respect to their median plane between their axial ends. Also the known bearings require considerable work upon assembly and final mounting.

BRIEF STATEMENT OF THE INVENTION

The object of the present invention is to provide a cylindrical roller thrust bearing which consists of few parts, can be assembled and taken apart in a very simple manner and has other advantages as compared with known cylindrical roller thrust bearings.

In accordance with the invention, a cylindrical roller thrust bearing is characterized by the fact that a roller cage is provided on either its inner or outer circumference or on both with a deformable lip the axially outer edges of which are inclined to the axis of rotation of the bearing and that steel discs forming the roller raceway are held in place by the lip which is inserted in snap-like fashion. The steel discs are provided preferably at their outer circumference with a burr over which the lip engages and a rounding axially outward of the burr to receive an edge of the lip. The steel discs forming the roller raceway may each be borne by a plastic ring which is supported and held by a bead formed in its outer circumference and engaged behind the lip. The plastic ring is provided with flanges which partially engage over the steel discs and possibly also the inner circumference of the roller raceway.

The lip which is positioned on the outer circumference of the roller cage rests in holding and sealing fashion over the burrs on the steel discs and the beads on the plastic rings respectively. The steel discs or the plastic rings can extend over the lip in axial direction. The roller cage consists of plastic, and preferably of polyamide, and the plastic ring also consists preferably of polyamide, and the plastic ring also consists preferably of polyamide which, however, is reinforced with glass fibers or other fibers having advantageous properties.

BRIEF DESCRIPTION OF DRAWINGS

The invention will be explained in further detail below with reference to embodiments given by way of example with reference to the drawings. In the drawings.

Figure 1:
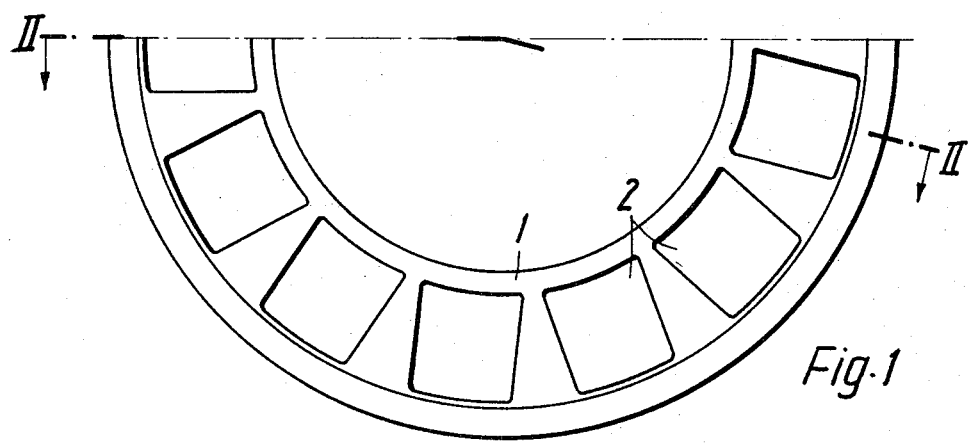
FIG. 1 shows a half bearing cage seen in axial direction.
Figure 2:
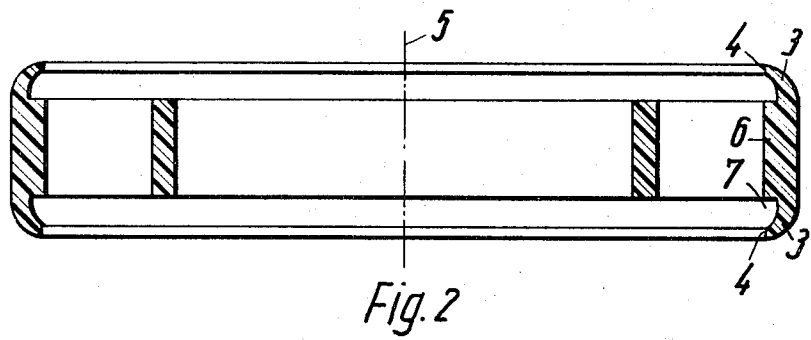
FIG. 2 is a section along the line II of FIG. 1.

From FIGS. 1 and 2 it can be noted that the bearing cage 1, in the recesses 2 of which approximately quadrangular cylindrical rollers are inserted, is provided at its outer circumference on both sides with deformable lip 3 thereon. This lip has its outer edges 4 inclined or bent inwards to the axis of rotation 5 of the bearing. Between the outer edges 4 of the lip 3 and medial portion 6 of the lip there are formed grooves 7.

Figure 3:
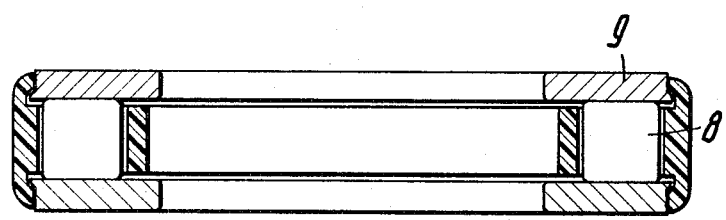
FIG. 3 is a section through an assembled bearing with steel discs as roller races.
Figure 4:
FIG. 4 is a section through a steel disc.

In accordance with FIG. 3, steel discs 9 are provided as a raceway for the cylindrical rollers 8. These discs 9 advantageously consist in known manner of hardened spring steel.

Figure 5:
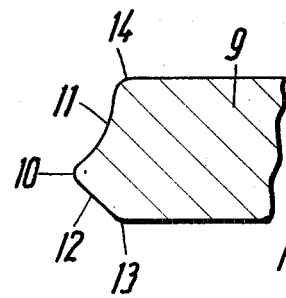
FIG. 5 is an enlarged detail view of FIG. 4.

On its outer circumference the steel disc 9 is provided, as shown in FIG. 5, with a burr 10 axially outward of which there is a rounding 11. The burr 10 on the disc 9 is connected with the axially inner edge of the disc by an oblique plane 12. The edge 13 adjoining same lies approximately at the same distance from the axis 5 as the opposite edge 14 does. Said edge 14 is preferably somewhat rounded.

In the embodiment of FIG. 3, the steel discs 9 have the burrs 10 engaged in snap-fastener-like fashion in the lip 3 so that the outer edges 4 of the lip grip over the burrs 10 and rest against the rounded portions 11. The dimensions are such that due to the elastic properties of the lip material, the edges 4 easily rest against the rounded portions 11, i.e., against the outer circumferences of the discs 9 and hold them tightly, so that bearing grease does not leak out, while on the other hand a rotation of the discs 9 with respect to the bearing cage is not prevented. The discs 9 can be made thinner depending on the purpose of use of the axial cylindrical roller bearing so that they do not extend over the lip 3, but they can also be made thicker so that they extend over the lip 3. The latter embodiment is the one that is generally customary.

The axial cylindrical roller bearing of the invention which has been described above consists, aside from the cylindrical rollers 8, only of three individual parts, two of which, namely the discs 9, can be interchanged as desired with each other. Only upon assembling must attention be paid to the position of the burr 10 so that it correctly inserts itself into the groove 7 and is gripped by one of the edges of the lip. The bearing can be mounted in simple fashion by first of all pressing a disc 9 in on one side of the bearing cage, whereupon the cylindrical rollers are inserted into the openings 2 of the cage, and the second disc 9 on the opposite side is also pressed into position in snap-fastener-like fashion. The bearing is symmetrical with respect to its medial plane, i.e., the plane which is formed by the axes of rotation of the cylindrical rollers 8, so that upon installation no attention need be paid to which side is which.

Figure 6:
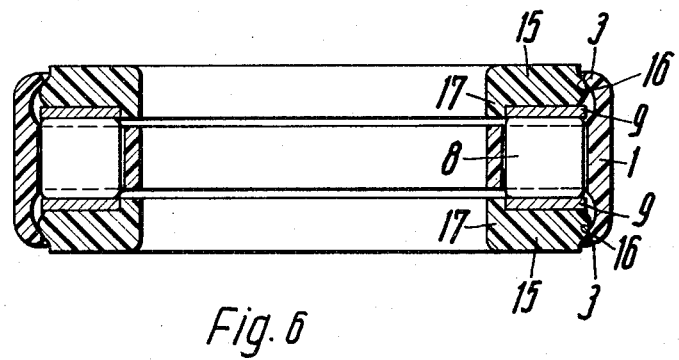
FIG. 6 is a section corresponding to FIG. 3 in a different embodiment of the invention.

Another embodiment of a cylindrical-roller thrust bearing in accordance with the invention is shown in FIG. 6. In said figure the same reference numbers have been used for the same parts. In this embodiment the steel discs 9 which form the races for the cylindrical rollers 8 are first inserted loosely in the cage on both sides of the rollers 8. Thereupon special plastic rings 15 which are provided on their outer circumference with a bead 16 which engages behind the lip 3 are pushed into place. These plastic rings 15 can be provided on their inner periphery with a flange 17 which grips around the steel disc 9 so that the latter is held in its position. The flange 17 can also be further extended towards the central plane of the bearing so that it surrounds the rollers 8 also from the inside and holds them in their raceway. With such an embodiment, the bearing cage can be developed in simpler manner; it need not be provided with an inner ring which closes the insertion openings 2 for the roller bearings off towards the inside.

The plastic ring 15 in the embodiment of a bearing shown in FIG. 6 is advantageously made from polyamide reinforced with glass fibers. This embodiment has the advantage that a certain resilience of the material can be utilized when the two surfaces which lie opposite each other and between which the axial cylindrical roller bearing is arranged do not lie precisely parallel to each other. The bearing of FIG. 6 has two parts more than the bearing described above, which parts to be sure, are interchangeable with each other. As a result of these additional parts there is, however, also obtained a particular advantage, and on the other hand machining and profiling of the outer edges of the steel discs 9 are unnecessary.

It is clear that it is unimportant for the essence of the invention whether the roller cage is so developed that it consists of an outer lip, an inner lip, intermediate partition walls and roller bodies arranged in the intermediate spaces, or whether it consists, for instance, merely of an outer lip and/or inner lip, provided merely that the lips are present, between which the upper and lower discs are inserted or engaged in snap-fastener-like fashion. The expression "roller cage" used here is therefore to be understood in the widest possible sense.

Figure 7:
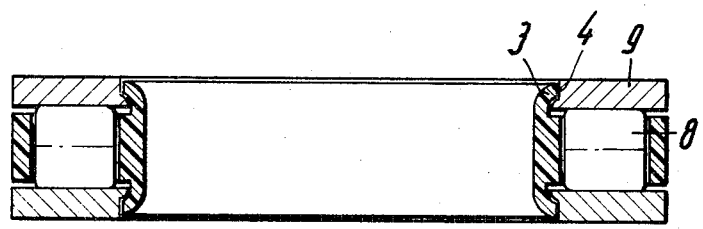
FIG. 7 is a section corresponding to FIG. 3 in another different embodiment of the invention.
Figure 8:
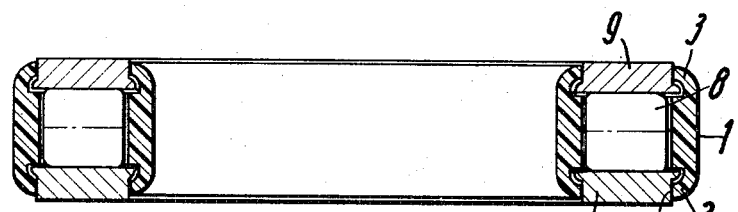
FIG. 8 shows still another embodiment.
Figure 9:
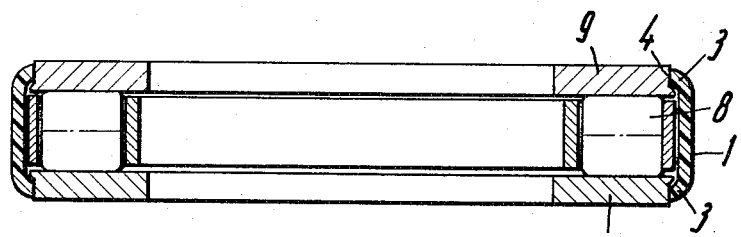
FIG. 9 shows still another embodiment.

For occasional special purposes of use, it may be of interest to develop the cylindrical-roller thrust bearing of the invention also in the manner that the lip is arranged on the innermost circumference. Without deviating from the basic concept of the invention, there then results a, so to say, mirror-image construction in which, to be sure, the picture of a section parallel to the axis looks almost the same, only that the two side parts are mirror images, i.e., the roller cage of the axial cylindrical roller bearing is provided with a lip on its inner circumference, said lip having its outer edge inclined away from the axis or rotation of the bearing and the discs forming the roller raceway are arranged inserted in snap-fastener-like manner behind said lip, as shown in FIG. 7. In a further development of this embodiment, there is also conceivable for special cases of use a development in which lips are arranged both on the outer circumference and on the inner circumference, into which lips correspondingly developed annular discs are inserted in snap-fastener-like fashion. In FIG. 8 such an axial cylindrical roller bearing is shown in connection with which furthermore, as a special feature of the design, the lips are not integral at the inner circumference but are formed on a separate ring which, so to say, replaces or supplements an inner margin of the roller cage.

The embodiments last described are to be considered special embodiments of the inventive concept which show the various, diversified possibilities which the invention offers for the development of cylindrical roller thrust bearings, the advantages described being reached in each case in their entirety.

It will be apparent to those skilled in the art that wide deviations may be made from the foregoing embodiments without departing from the main theme of invention set forth in the following claims.

I claim:

1. A cylindrical roller thrust bearing comprising in combination:
    a pair of substantially planar discs of about the same size and spaced parallel each to the other with each normal to and positioned about a common axis,
    a ring of rollers positioned in a cage member between the discs with each of the rollers arranged radially relative the axis and with the discs providing a raceway for the rollers,
    each of the discs having a margin,
    said bearing cage having an elastically deformable lip surrounding the margin with edges and having an extended condition in which the edges fit snugly over the margins so that the discs and rollers thereby are held in position.

2. The thrust bearing of claim 1 with:
    each of the discs provided at its said margin with a continuous burr over which one of the edges of the lip engages in said entended condition,
    each of the discs having an outward face and provided with a concavely rounded portion from its burr to its radially outward face to receive one of the edges of the lip.

3. The thrust bearing of claim 2 with:
    each of the discs having an outer circumference,
    the margins being on the outer circumferences.

4. The thrust bearing of claim 2 with:
    each of the discs having an inner circumference,
    the margins being on the inner circumferences.

5. The thrust bearing of claim 2 with:
    each of the discs having an inner and an outer circumference,
    each of the discs having a margin on both its inner and its outer circumference,
    one of said lips operatively connected on the inner circumferences and one of said lips operatively connected on the outer circumferences.

6. The thrust bearing of claim 5 with said cage made of polyamide.

7. A cylindrical roller thrust bearing comprising in combination:
    a pair of substantially planar discs of about the same size and spaced parallel each to the other with each normal to and positioned about a common axis,
    a ring of rollers positioned in a cage member between the discs with each of the rollers arranged radially relative the axis and with the discs providing a raceway for the rollers,
    each of the discs borne by a plastic member having a margin,
    said bearing cage having an elastically deformable lip surrounding the margin with edges and having an extended condition in which the edges fit snugly over the margins so that the discs and rollers thereby are held in position.

8. The thrust bearing of claim 7 with:
    each of the discs made of steel,
    each of the plastic members provided at its said margin with a continuous bead over which one of the edges of the lip engages in said extended condition.

9. The thrust bearing of claim 7 with:
each of the plastic members having an outer circumference,
the margins being on the outer circumferences.

10. The thrust bearing of claim 7 with:
each of the plastic members having an inner circumference,
the margins being on the inner circumferences.

11. The thrust bearing of claim 7 with:
each of the plastic members having an inner and an outer circumference,
each of the plastic members having a margin on both its inner and its outer circumference,
one of said lips operatively connected on the inner circumferences and one of said lips operatively connected on said outer circumferences.

12. The thrust bearing of claim 9 with:
each of the discs having an inner circumference,
each of the plastic members having a flange which grips on the discs at its said inner circumference.

13. The thrust bearing of claim 12 with:
the cage member having an inner circumference,
the flange enclosing the cage member.

14. The thrust bearing of claim 13 with said cage made of polyamide.

15. A cylindrical roller thrust bearing comprising in combination:
a pair of substantially planar discs of about the same size and spaced parallel each to the other with each normal to and positioned about a common axis,
a ring of rollers positioned in a cage member between the discs with each of the rollers arranged radially relative the axis and with the discs providing a raceway for the rollers,
each of the discs having a first margin,
each of the discs borne in a plastic member having a second margin,
said bearing cage having an elastically deformable lip surrounding the margin with edges and having an extended condition in which the edges fit snugly over the first and second margins so that the discs and rollers thereby are held in position.

16. The thrust bearing of claim 15 with:
each of the discs made of steel,
each of the discs provided at its said first margin with a continuous burr over which one of the edges of the lip engages in said extended condition,
each of the plastic members provided at its said second margin with a continuous bead over which one of the edges of the lip engages in said extended condition.

17. The thrust bearing of claim 16 with:
each of the discs and each of the plastic members having an outer circumference,
the margins of the discs and the margins of the plastic members being on their respective outer circumferences.

18. The thrust bearing of claim 16 with:
each of the discs and each of the plastic members having an inner circumference,
the margins of the discs and the margins of the plastic members being on their respective inner circumferences.

19. The thrust bearing of claim 16 with:
each of the discs and each of the plastic members having an inner circumference as well as an outer circumference,
each of the discs and each of the plastic members having a margin on both its inner and its outer circumference,
one of said lips operatively connected on the inner circumferences and one of said lips operatively connected on the outer circumferences.

20. The thrust bearing of claim 21 with said cage made of polyamide.

21. The thrust bearing of claim 3 with the discs extending axially over the lip.

* * * * *